(12) United States Patent
Sung et al.

(10) Patent No.: US 7,911,767 B2
(45) Date of Patent: Mar. 22, 2011

(54) ELECTRIC DOUBLE-LAYER CAPACITOR

(75) Inventors: Do Kyong Sung, Gyeonggi-do (KR);
Jun Tae Jung, Gyeonggi-do (KR); Jin Woo Hur, Gyeonggi-do (KR)

(73) Assignee: Vina Technology Co., Ltd., Gyeonggi-do (KR)

( * ) Notice: Subject to any disclaimer, the term of this patent is extended or adjusted under 35 U.S.C. 154(b) by 305 days.

(21) Appl. No.: 12/093,995

(22) PCT Filed: Jun. 14, 2006

(86) PCT No.: PCT/KR2006/002268
§ 371 (c)(1),
(2), (4) Date: May 16, 2008

(87) PCT Pub. No.: WO2007/058422
PCT Pub. Date: May 24, 2007

(65) Prior Publication Data
US 2008/0285208 A1 Nov. 20, 2008

(30) Foreign Application Priority Data
Nov. 16, 2005 (KR) .................. 10-2005-0109432

(51) Int. Cl.
*H01G 9/00* (2006.01)
*H01G 9/02* (2006.01)
(52) U.S. Cl. ..................... 361/502; 252/62.2
(58) Field of Classification Search .............. 361/502; 252/62.2
See application file for complete search history.

(56) References Cited

U.S. PATENT DOCUMENTS

| | | | | |
|---|---|---|---|---|
| 6,059,847 A * | 5/2000 | Farahmandi et al. | ........ | 29/25.03 |
| 6,914,768 B2 * | 7/2005 | Matsumoto et al. | .......... | 361/502 |
| 6,980,415 B2 * | 12/2005 | Higono et al. | ................ | 361/504 |
| 7,214,249 B2 * | 5/2007 | Ohta et al. | .................... | 29/25.03 |
| 7,411,777 B2 * | 8/2008 | Chiba | ........................ | 361/502 |
| 7,656,645 B2 * | 2/2010 | Chiba | ........................ | 361/502 |
| 2002/0048143 A1 * | 4/2002 | Lee et al. | ..................... | 361/502 |
| 2005/0219797 A1 * | 10/2005 | Nakamura et al. | ........... | 361/502 |

FOREIGN PATENT DOCUMENTS

| | | |
|---|---|---|
| JP | 7-22295 | 1/1995 |
| JP | 2002-334815 | 11/2002 |
| JP | 2005139100 A * | 6/2005 |
| WO | WO 2005088656 A1 * | 9/2005 |

OTHER PUBLICATIONS

Search report, 2 pages, from WO2007/058422 A1, published May 24, 2007.

* cited by examiner

*Primary Examiner* — Eric Thomas
*Assistant Examiner* — David M Sinclair
(74) *Attorney, Agent, or Firm* — Seyfarth Shaw LLP

(57) ABSTRACT

Provided is an electric double-layer capacitor. The electric double-layer capacitor includes an electrode portion composed of an anode and a cathode; a separator for providing electrical isolation between the anode and cathode; and an electrolyte solution which is filled in a space between the anode and cathode so as to form electric double-layers on surfaces of the anode and cathode upon application of a predetermined voltage, and in which a solvent and a solute are mixed so as to have a concentration of 1.25 to 2.5 mol/L.

3 Claims, 5 Drawing Sheets

Butylmethylpyrrolidinium
tetrafluoroborate

Ethylmethylpyrrolidinium
tetrafluoroborate

Dimethylpyrrolidinium
tetrafluoroborate

Propylene Carbonate

Acetonitrile

Tetraethylammonium tetrafluoroborate

ELECTRIC DOUBLE-LAYER CAPACITOR

This application is a U.S. National Phase of International Patent Application Serial No. PCT/KR2006/002268, filed 14 Jun. 2006 which claims priority to Korean Patent Application No. 10-2005-0109432 filed 16 Nov. 2005.

TECHNICAL FIELD

The present invention relates to an electric double-layer capacitor. More specifically, the present invention relates to an electric double-layer capacitor utilizing an electrolyte containing an ionic liquid in order to maintain an electrolyte concentration at a constant level, and being capable of improving high-current discharge characteristics and cycle characteristics by adjusting the composition of a solvent.

BACKGROUND ART

In general, an electric double-layer is a structure wherein a thin film layer of an object exhibits continuous presence of positive charges at one side and continuous presence of negative charges at the other side, or distribution of positive and negative charges at the same surface density for two sides, and typically refers to a double layer composed of dipoles. Usually, rearrangement of charges and formation of an electric double-layer occur at the boundary between different materials.

In addition, at the interface between an electrode in the solid state and an aqueous electrolyte solution in the liquid-state, selective adsorption of either cations or anions in the solution or dissociation of solid surface molecules, arrangement/adsorption of dipoles toward the interface and the like may result in formation of electric double-layers. The electric double-layer is also in close connection with a variety of interfacial electrochemical phenomena, such as electrode reaction, electrokinetic phenomena, stability of colloid and the like.

Electric double-layer capacitors (EDLCs) utilizing the electric double-layer are systems that accumulate electrical energy as do batteries, by using the electric double-layer state as a dielectric, via formation of an electrostatic layer on the boundary surface between an activated carbon electrode and an organic electrolyte, and are based on the principle of adsorption/desorption of charges onto the electric double-layers at the interfaces between solid electrodes and solid or liquid electrolytes.

Particularly, the electric double-layer capacitors have a low-energy density as compared to common batteries, but exhibit superior discharge characteristics including instantaneous high current and high output performance, and a feasible semi-permanent life due to charge/discharge cycle characteristics that can be performed several hundreds of thousands times.

Therefore, the electric double-layer capacitors can be suitably used not only as an auxiliary power supply (APS) of mobile information communication equipment, which requires rapid charge/discharge characteristics and high power, such as mobile phones, notebook computers and PDAs, but also as a main or auxiliary power supply of hybrid vehicles requiring high capacity, traffic road safety/guide lamps or blinkers for safe driving of night drivers and uninterruptible power supplies (UPSs).

As active materials for both anodes and cathodes in the electric double-layer capacitors, activated carbon, which has a large surface and is an electrically-stable material, is typically used. Activated carbon has a large surface area of more than 1500 m²/g due to the presence of large numbers of pores on the surface thereof. Even though an aqueous solution or an organic electrolyte may be used as an electrolyte, a size of salt particles should be in the appropriate range in order to obtain large capacity and high charge/discharge characteristics, upon taking into consideration the fact that the pore size of activated carbon is about 2 nm.

In particular, the electrolyte employed in the electric double-layer capacitor is required to meet high adhesivity and low resistance while maintaining high conductivity and capability to dissolve ionic conductive salts at high concentrations.

The electrolytes for the electric double-layer capacitor according to conventional arts employ a solution of tetraalkyl ammonium salts such as tetraethylammonium tetrafluoroborate, dissolved in propylene carbonate or acetonitrile.

Propylene carbonate is widely used as an electrolyte as it is non-toxic and safe and has a high-boiling point. However, propylene carbonate also suffers from limitations in application thereof to large-sized products requiring high output and low resistance, due to its own high resistivity.

For instance, upon performing a life test under high-output conditions of 50 mA/F for the electrolytes utilizing propylene carbonate, the capacity at 20,000 cycle times exhibits a more than 30% decrease, and therefore is measured as a less than 70% level of the initial capacity. Consequently, such propylene carbonate-based electrolytes pose problems associated with difficulty of application thereof to large-scale power supplies of hybrid vehicles or UPSs, requiring constant capacity under conditions of more than 100,000 cycle times.

In addition, acetonitrile is suitable for generating high output due to low viscosity and high solubility in salts, but exhibits various problems such as a low boiling point of 82° C., high inflammability and high probability of cyanide production upon occurrence of a fire. Particularly when it is desired to design large-scale products using acetonitrile, application of heat higher than 140° C. results in sublimation of internal electrolytes which in turn causes the fatal problem of rapid explosion. Further, acetonitrile is a member of organic cyanide compounds classified into categories of toxic substances, and therefore suffers from limitations in use thereof from a standpoint of technical design characteristics attaching great importance to environmental safety.

DISCLOSURE

Technical Problem

Therefore, the present invention has been made in view of the above problems, and it is an object of the present invention to provide an electric double-layer capacitor having superior cycle characteristics and high-current charge/discharge characteristics via adjustment of an electrolyte concentration to a predetermined level, and being capable of reducing a capacity decrease and a resistance increase rate upon high-current cycles, via inclusion of an ionic liquid as a solute of an electrolyte.

It is another object of the present invention to provide an electric double-layer capacitor having improved cycle characteristics and high-current charge/discharge characteristics by increasing an electrolyte concentration via use of one or more carbonate-based solvents having a high dielectric constant and high conductivity as a solvent of an electrolyte.

Technical problems to be solved by the present invention are not limited to above-mentioned problems, and any other technical problems, which were not mentioned above, would be obviously appreciated to those skilled in the art from the following description.

Technical Solution

In accordance with an aspect of the present invention, the above and other objects can be accomplished by the provision of an electric double-layer capacitor comprising an electrode portion composed of an anode and a cathode; a separator for providing electrical isolation between the anode and cathode; and an electrolyte solution which is filled in a space between the anode and cathode so as to form electric double-layers on surfaces of the anode and cathode when a predetermined voltage is applied, and in which a solvent and a solute are mixed so as to have a concentration of 1.25 to 2.5 mol/L.

Specific details of other aspects and embodiments are encompassed in the detailed description and accompanying drawings.

These and other objects, advantages and features of the present invention and methods of achieving the same will become apparent from the detailed embodiments given below which are made in conjunction with the following drawings. This invention may, however, be embodied in different forms and should not be construed as being limited to the embodiments set forth herein. Rather, these embodiments are provided so that this disclosure will be thorough and complete, and will fully convey the scope of the invention to those skilled in the art. Therefore, the present invention should be defined by attached claims only. In the drawings, like numbers refer to like elements throughout the specification.

Further, in the drawings, the thicknesses and dimensions of layers and films or regions are exaggerated for clarity of the specification. It will also be understood that when a layer or film is referred to as being "on" another layer or film, it can be directly adjacent to the other layer or film, or intervening layers or films may also be present.

DESCRIPTION OF DRAWINGS

The above and other objects, features and other advantages of the present invention will be more clearly understood from the following detailed description taken in conjunction with the accompanying drawings, in which.

BEST MODE

Figure 1:
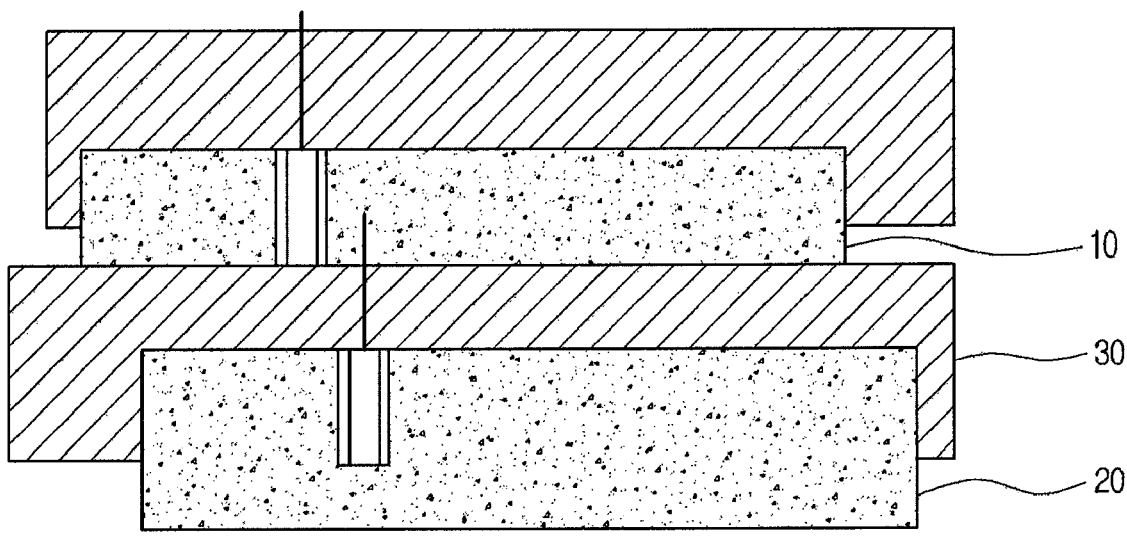
FIG. 1 is a schematic view of an electric double-layer capacitor in accordance with the present invention.

FIG. 1 is a schematic view of an electric double-layer capacitor in accordance with Examples of the present invention. Hereinafter, the constitution of the electric double-layer capacitor will be reviewed in more detail with reference to FIG. 1.

Referring now to FIG. 1, the electric double-layer capacitor includes an electrode portion composed of an anode 10 and a cathode 20; a separator 30 for isolation between the anode 10 and cathode 20; and an electrolyte forming electric double-layers on contact surfaces between the electrodes and separator 30, while being in contact with electrodes.

The electrode portion is formed by mixing an electrode material, a conductive material, a binder and a solvent in a mixer to prepare a slurry. More specifically, the electrode is fabricated by coating a thin film of the resulting slurried mixture on a current collector such as aluminum foil, using a conventional manner, e.g., a doctor knife applicator, and evaporating the solvent with breeze heating, thereby attaching the electrode layer to the current collector.

The electrode portion may employ activated carbon having capacitance of more than 100 F/g, more specifically 100 to 300 F/g, as electrode materials for both anode 10 and cathode 20.

In addition, the conductive material is used to enhance conductivity of the electrodes and may employ metal powder or carbon powder as a powdered conductive material. Particularly, as the material for carbon powder, pyrolytic carbon, e.g., carbon black and graphitized products thereof, artificial and natural flake graphite powder, carbon fibers and graphitized products thereof, may be used.

The electrolyte forms electric double-layers on contact surfaces with electrodes while being in contact with electrodes, via use of an ammonium salt as a solute and at least one carbonate selected from the carbonate group as a solvent.

In addition, the electrolyte is preferably formed to have a concentration of 1.25 mol/L to 2.5 mol/L, more preferably 1.5 mol/L to 2.0 mol/L.

Further, the electrolyte concentration is allowed to be increased to a range of more than 1.25 mol/L, via enhancement of electrochemical stability of the salt by using an ionic liquid instead of the ammonium-based salt, or using a certain level of the ionic liquid in admixture with the ammonium-based salt, as the solute of the electrolyte.

Examples of the ammonium-based salt that can be used in the present invention may include at least one ammonium salt selected from the ammonium group consisting of tetraethylammonium tetrafluoroborate, ethylmethylimidazolium tetrafluoroborate, tetraethylammonium hexafluorophosphate and tetraethylammonium perchlorate.

In addition, examples of the carbonate solvent materials that can be used in the present invention may include at least one carbonate and derivatives thereof selected from the carbonate group consisting of propylene carbonate (PC), ethylene carbonate (EC), dimethyl carbonate (DMC), diethyl carbonate (DEC) and ethylmethyl carbonate (EMC). Among these carbonate-based solvents, it is preferred to add at least 10 to 40 vol % of ethylene carbonate (EC) as the solvent.

The electrolyte concentration plays a very important role to improve high-current cycle characteristics of the electric double-layer capacitor. For example, the solubility of tetraethylammonium ions in propylene carbonate is limited to 1.4 mol/L, and increasing concentrations of tetraethylammonium and propylene carbonate conversely result in decreased conductivity or increased resistance. Therefore, when it is desired to use an electrolyte, which was prepared by dissolving the tetraethylammonium salt in propylene carbonate, in the electric double-layer capacitor, the electrolyte concentration exceeding a specified level may lead to the problems associated with deterioration of high-current cycle characteristics.

Further, upon using activated carbon having capacitance of more than 100 F/g as the electrode material, the total amount of charges used in charging should be supplied from the electrolyte. At this time, it is necessary that the electrolyte has a concentration of more than 1 mol/L.

Figure 2:
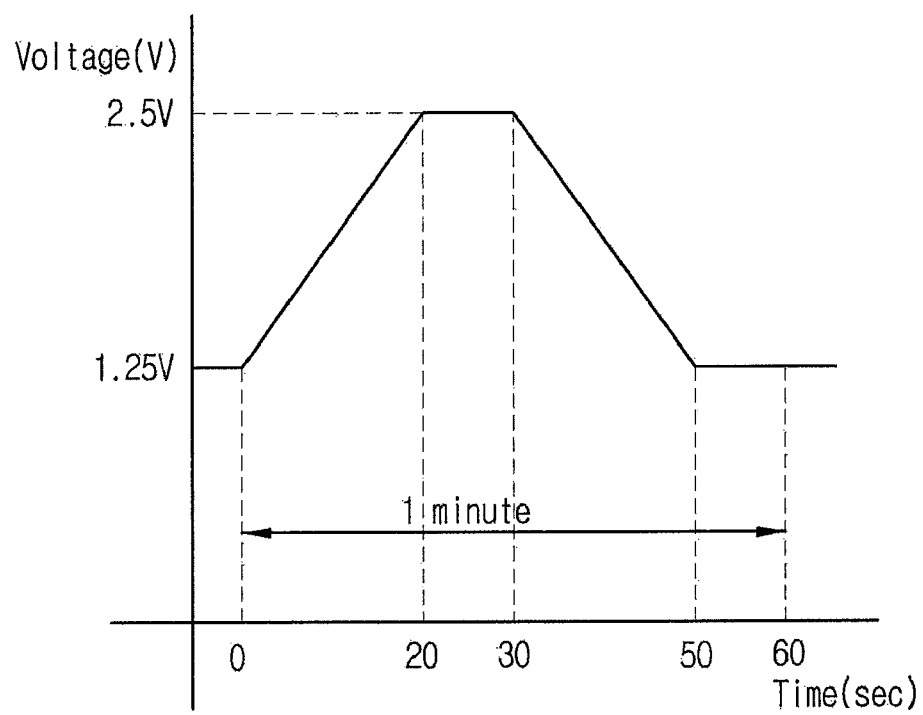
FIG. 2 is a graph showing cycle test conditions for an electric double-layer capacitor proposed by US Department of Energy (DOE)
Figure 3:
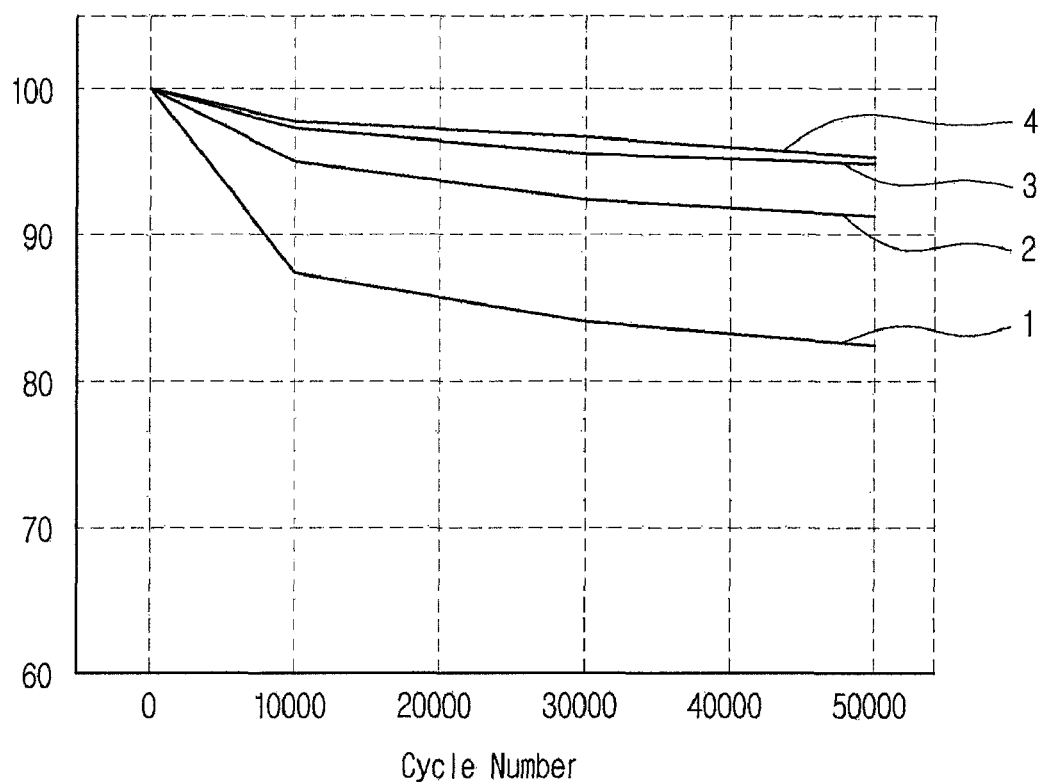
FIG. 3 is a graph showing changes in capacity of an electric double-layer capacitor with varying electrolyte concentrations, upon testing under test conditions of FIG. 2.

FIG. 2 is a graph showing cycle test conditions for an electric double-layer capacitor specified by US Department of Energy (DOE), and FIG. 3 is a graph showing changes in capacity of an electric double-layer capacitor with varying electrolyte concentrations, upon testing under test conditions of FIG. 2.

First, referring now to FIG. 2, a cycle test of the electric double-layer capacitor, as proposed by US DOE, is conducted by a life test as follows: continuously repeating one cycle consisting of charging from ½ Vw up to Vw for 20 sec under charge/discharge current conditions of 50 mA/F, maintaining at Vw for 20 sec, discharging from Vw to ½ Vw for 20 sec, and maintaining at ½ Vw for 10 sec. The criteria require retaining 80% of the initial capacity even after repeating more than 100,000 cycles. That is, a decrease of capacity should be within 20% of the initial capacity.

For example, when the life test of the capacitor is carried out by setting Vw (Working Voltage) to 2.5V under output conditions of 50 mA/F in FIG. 2, the capacitor life is measured by continuously repeating one cycle (70 sec) consisting of: charging from 1.25 V up to 2.5 V for 20 sec, maintaining at 2.5 V for 20 sec, discharging from 2.5 V to 1.25 V for 20 sec, and maintaining at 1.25 V for 10 sec.

FIG. 3 shows a relationship between the electrolyte concentration and high-current cycle characteristics of the electric double-layer capacitor. The graph of FIG. 3 shows experimental results performed by measuring (50,000 cycle times) cycle characteristics of the electric double-layer capacitor involving sequential adjustment of concentrations of ethylmethylimidazolium tetrafluoroborate and propylene carbonate to 1 mol/L (1), 1.25 mol/L (2), 1.5 mol/L (3) and 2 mol/L (4) and discharge conditions of 20 mA/F.

As shown in FIG. 3, when concentrations of ethylmethylimidazolium tetrafluoroborate and propylene carbonate are 1.5 mol/L (3) and 2 mol/L (4), experimental results of 50,000 cycles show that the capacity of the electric double-layer capacitor retains a level of more than 95% of the initial capacity thereof. In addition, for 1.25 mol/L (2) concentration, the capacity of the electric double-layer capacitor retains a level of more than 90% of the initial capacity thereof.

Whereas, when concentrations of ethylmethylimidazolium tetrafluoroborate and propylene carbonate are 1.0 mol/L (1), it is shown that the capacity of the electric double-layer capacitor retains about 80% level of the initial capacity thereof.

As can be seen from the results of FIG. 3, it is apparent that an increasing concentration of the electrolyte is accompanied by reduction in decreases of the capacity of the electric double-layer capacitor, and the presence of the electrolyte exceeding the specified level further diminishes the decrease of capacitor's capacity, thus significantly improving cycle characteristics. Particularly when the electrolyte concentration exceeds 1.5 mol/L, a decrease in the capacity of the electric double-layer capacitor is significantly reduced and thereby cycle characteristics are improved.

On the other hand, upon taking into account a decreased amount in the capacity of the electric double-layer capacitor that occurred under experimental conditions of 50,000 cycles, at about 1.5 mol/L level of the electrolyte concentration, it is not feasible to apply such a capacitor to a large-scale power supply requiring a constant amount of accumulated capacity even under conditions of more than 100,000 cycle times, such as that required for hybrid vehicles or UPSs.

Further, low temperature ranges of −40° C. to −20° C. may result in degradation of characteristics due to solute precipitation resulting from reduced solubility. In particular, at electrolyte concentrations of more than 2.5 mol/L, increases in the viscosity and resistance of the electrolyte become more severe due to solute precipitation.

To this end, in Examples of the present invention, in order to make it possible to apply to desired applications, even when activated carbon having capacitance of more than 100 F/g is used, the electrolyte is formed to have a concentration of 1.25 mol/L to 2.5 mol/L, more preferably 1.5 mol/L to 2.0 mol/L, thereby improving cycle characteristics and high-current charge/discharge characteristics of the electric double-layer capacitor.

Additionally, solubility of the electrolyte is determined by various factors including a dielectric constant of the solvent, a dissociation degree of salts, and electrical stability of salts. Therefore, in order to achieve the electrolyte concentration of the electric double-layer capacitor of more than 1.25 mol/L in the embodiment of the present invention, the solute and solvent composition of the electrolyte is controlled as desired.

In order to increase the electrolyte concentration in Examples of the present invention, an ionic liquid is used as a solute instead of the ammonium-based salt, or a certain level of the ionic liquid is used in admixture with the ammonium-based salt. The ionic liquid is in a liquid phase at room temperature, and increases the concentration of the electrolyte because the ionic liquid is not dissociated by the solvent as it is already present in the dissociated state and has liquid characteristics.

Figure 4:
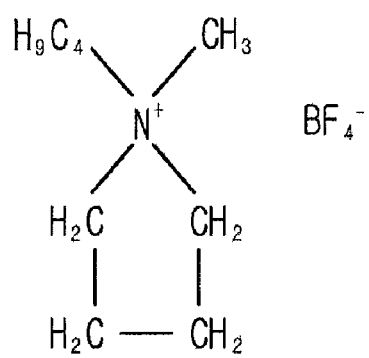
FIG. 4 shows chemical structures of ethylmethylpyrrolidinium tetrafluoroborate, butylmethylpyrrolidinium tetrafluoroborate and dimethylpyrrolidinium tetrafluoroborate, which are used in Examples of the present invention.
Figure 4:
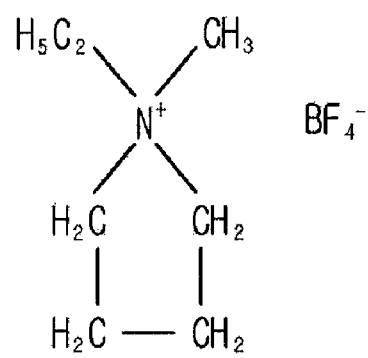
Figure 4:
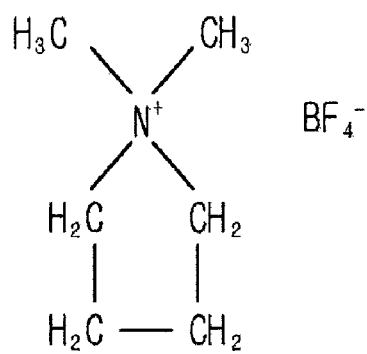

However, since the ionic liquid such as imidazolium exhibits low stability at a high temperature (60° C.) upon charging of the capacitor, which thereby results in the problems associated with generation of large amounts of gases, it is preferred to use a pyrrolidinium-based cation having characteristics of the ionic liquid with high electrochemical stability and high solubility, as the solute of the electrolyte, or use the pyrrolidinium-based cation in admixture with an ammonium-based cation. Generally, although the ionic liquid refers to a material that is in the liquid state at room temperature, it commonly represents a material that is a liquid below 100° C. in the scientific world. As the pyrrolidinium-based cation, there may be used at least one cation selected from the group consisting of ethylmethylpyrrolidinium, butylmethylpyrrolidinium and dimethylpyrrolidinium ions. FIG. 4 shows chemical structures of ethylmethylpyrrolidinium tetrafluoroborate, butylmethylpyrrolidinium tetrafluoroborate and dimethylpyrrolidinium tetrafluoroborate, which are used in Examples of the present invention.

The ionic liquid, as described hereinabove, is used in an amount such that the electrolyte concentration is in the range of 1.25 mol/L to 2.5 mol/L, or is mixed with an ammonium-based salt, and upon considering the viscosity of the electrolyte, it is preferred to use the ionic liquid in an amount of less than 4 mol/L.

Further, in order to increase the electrolyte concentration in Examples of the present invention, any one carbonate selected from the above-mentioned carbonate group is used as the solvent of the electrolyte, and the selected carbonate may be used in admixture with ethylene carbonate having a relatively high dielectric constant of the solvent among carbonate-based solvents. The ethylene carbonate has a high dielectric constant and high conductivity, as well as having a high melting point of 42° C. As a consequence, due to a high melting point, ethylene carbonate cannot be used alone and therefore is used in admixture with other solvents.

Since the dielectric constant in the mixed solution depends upon a mole fraction of the solvent and an increasing amount of ethylene carbonate incorporated into the mixed solution results in deterioration of low-temperature characteristics, the incorporated amount of ethylene carbonate should be adjusted to a proper level. Ethylene carbonate may be preferably added in an amount of less than 40 mol %, more preferably in an amount of less than 30 mol %. For example, when ethylene carbonate is mixed into propylene carbonate, ethylene carbonate of less than 30 mol % leads to melting point depression and increased solubility and electrical conductivity. As one embodiment of the present invention, upon mixing ethylene carbonate into propylene carbonate, it is preferred to ensure that the added amount of ethylene carbonate is less than 30 mol %.

MODE FOR INVENTION

EXAMPLES

Hereinafter, an electric double-layer capacitor in accordance with the present invention will be described in more detail with reference to the following examples. These examples are provided only for illustrating the present invention and should not be construed as limiting the scope and spirit of the present invention.

Examples 1 through 11

Using activated carbon (Kansai Cokes, MSP-20) having capacitance of 140 F/g, a specific surface area of 2200 m$^2$/g and a pore volume of 1.0 cc/g, as an electrode active material and using a slurry containing 80 wt % of activated carbon, 12 wt % of carbon black (Super-P), 3 wt % of carboxymethylcellulose (CMC), and 5 wt % of a polytetrafluoroethylene (PTFE) binder, thin films were coated with the same thickness on both sides of aluminum foil having a thickness of 20 μm, thereby fabricating electrodes having a thickness of 200 μm. The electrodes were cut into a size of 3 cm×40 cm, wound into a cylindrical form and then placed into metal cases having a size of D18 mm×L40 mm, thereby fabricating cells.

Figure 5:
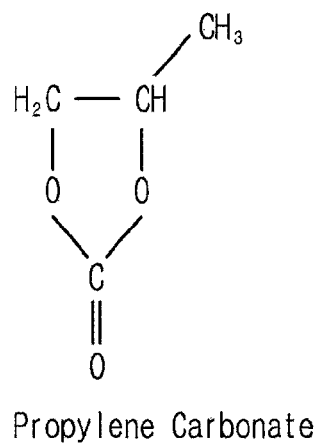
FIG. 5 shows chemical structures of propylene carbonate and tetraethylammonium tetrafluoroborate, which are used in Examples of the present invention.
Figure 5:
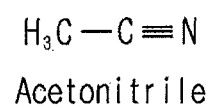
Figure 5:
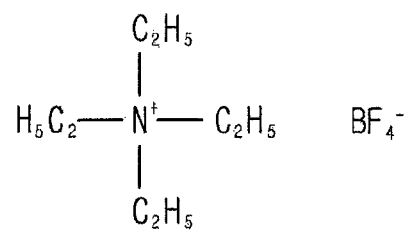

For Examples 1 through 11, total moles of electrolytes contained in the thus-fabricated cells were sequentially increased from 1M up to 2M, a mixed amount of tetraethylammonium tetrafluoroborate (TEABF$_4$) and butylmethylpyrrolidinium tetrafluoroborate (BMPBF$_4$) salts was adjusted, and a mixed amount of propylene carbonate (PC) and ethylene carbonate (EC) solvents was also adjusted, as desired. FIG. 5 shows chemical structures of propylene carbonate and tetraethylammonium tetrafluoroborate, which are used in Examples of the present invention.

Table 1 below shows the composition of the electrolyte in accordance with Examples 1 through 11, and Table 2 below shows the results of capacity and resistance as measured under cycle test conditions of FIG. 2, using the above-fabricated cells. The cycle test was carried out by repeating 50,000 charge/discharge cycles under charge/discharge conditions of 50 mA/F and a working voltage of 2.5V. After proceeding with charge/discharge cycles, changes in capacity at the same current and resistance at 1 kHz were measured and compared with initial values.

Comparative Example 1

A cell was fabricated in the same manner as in Examples 1 through 11, except that the given total mole of an electrolyte contained in the cell was 1 M, tetraethylammonium tetrafluoroborate (TEABF$_4$) alone was used as a salt, and 100% propylene carbonate (PC) was used as solvent, according to a conventional art.

TABLE 1

| | Total moles of electrolyte | Salts | | Solvents | |
|---|---|---|---|---|---|
| | | TEABF$_4$ | BMPBF$_4$ | PC | EC |
| Comp. Ex. 1 | 1.0M | 1.0M | 0.0M | 100% | 0% |
| Ex. 1 | 1.0M | 1.0M | 0.0M | 80% | 20% |
| Ex. 2 | 1.0M | 0.0M | 1M | 100% | 0% |
| Ex. 3 | 1.25M | 1.0M | 0.25M | 100% | 0% |
| Ex. 4 | 1.25M | 0.25M | 1M | 100% | 0% |
| Ex. 5 | 1.25M | 1.0M | 0.25M | 80% | 20% |
| Ex. 6 | 1.5M | 1.0M | 0.5M | 100% | 0% |
| Ex. 7 | 1.5M | 1.0M | 0.5M | 80% | 20% |
| Ex. 8 | 1.5M | 0.5M | 1M | 100% | 0% |
| Ex. 9 | 1.5M | 0.0M | 1.5M | 100% | 0% |
| Ex. 10 | 2.0M | 1.0M | 1.0M | 100% | 0% |
| Ex. 11 | 2.0M | 0.0M | 2M | 100% | 0% |

TABLE 2

| | Initial Capacity (F) | Initial Resistance (mΩ) | Decrease in capacity (%) | Increase in resistance (%) |
|---|---|---|---|---|
| Comp. Ex. 1 | 58.5 | 13.6 | 21.0% | 45% |
| Ex. 1 | 59.5 | 12.7 | 19.5% | 30% |
| Ex. 2 | 58.7 | 12.5 | 19.0% | 25% |
| Ex. 3 | 58.7 | 12.3 | 12.0% | 25% |
| Ex. 4 | 59.0 | 12.0 | 8.0% | 20% |
| Ex. 5 | 59.7 | 12.2 | 8.0% | 20% |
| Ex. 6 | 60.0 | 12.1 | 5.0% | 15% |
| Ex. 7 | 60.4 | 11.8 | 5.5% | 15% |
| Ex. 8 | 60.7 | 11.8 | 5.5% | 8.0% |
| Ex. 9 | 61.0 | 11.9 | 4.1% | 7.5% |
| Ex. 10 | 60.8 | 11.8 | 3.8% | 7.5% |
| Ex. 11 | 61.5 | 11.7 | 4.0% | 6.5% |

Figure 6:
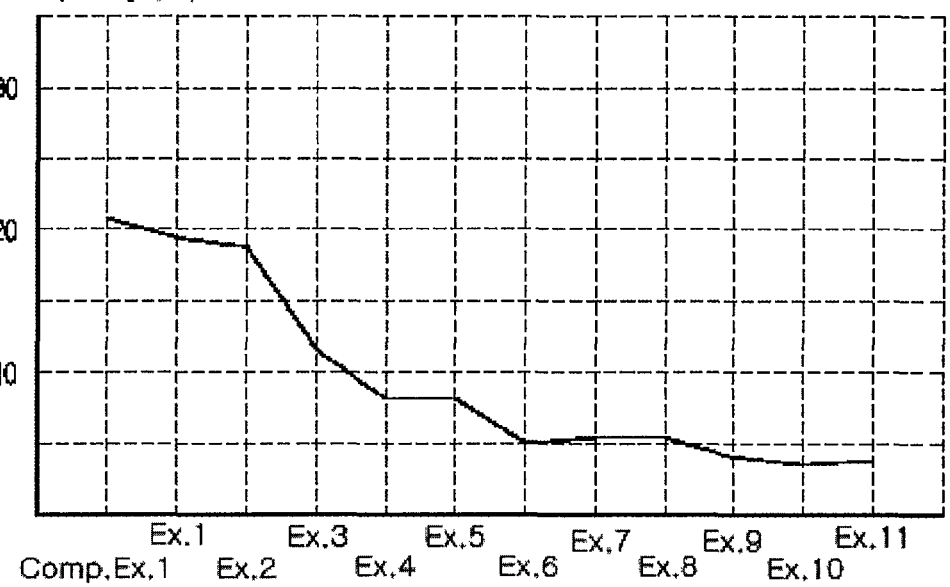
FIG. 6 is a graph showing % decrease in capacity of cells in accordance with Examples of the present invention.
Figure 7:
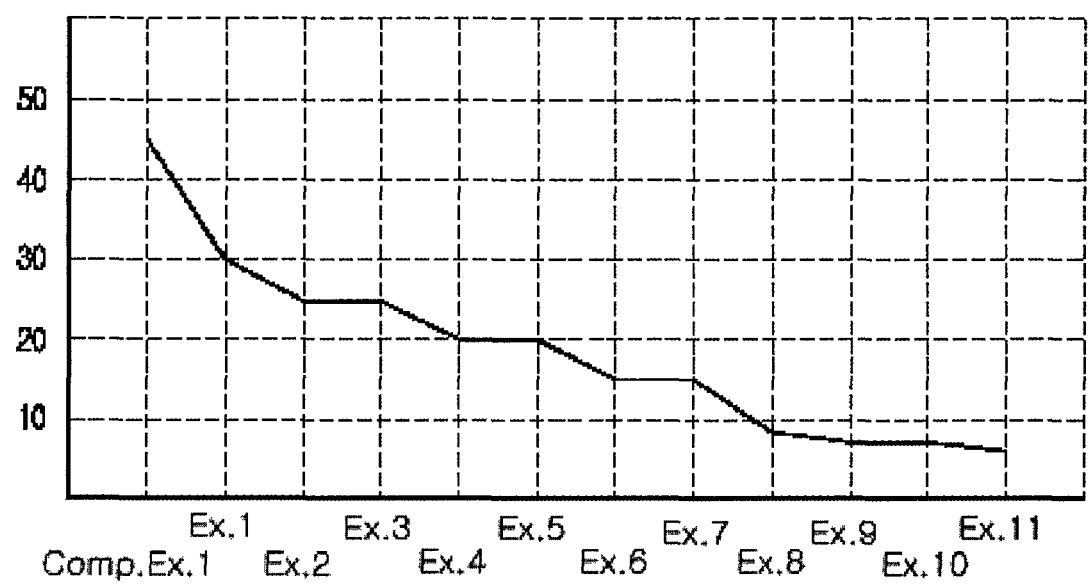
FIG. 7 is a graph showing % increase in resistance of cells in accordance with Examples of the present invention.

FIG. 6 is a graph showing % decrease in capacities of cells in accordance with Examples of Table 2, and FIG. 7 is a graph showing % increase in resistance of cells in accordance with Examples of Table 2. Hereinafter, characteristics of cells prepared in Examples of the present invention will be specifically examined with reference to FIG. 6 and FIG. 7.

As shown in FIG. 6 and FIG. 7, the experimental results of Comparative Example 1, in which 1M tetraethylammonium tetrafluoroborate (TEABF$_4$) as a salt and 100% propylene carbonate (PC) as a solvent were used, exhibited 21% decrease in capacity and 45% increase in resistance. The experimental results of Example 2, in which 1M butylmethylpyrrolidinium tetrafluoroborate (BMPBF$_4$) as a salt and 100% propylene carbonate (PC) as a solvent were used, exhibited 19% decrease in capacity and 25% increase in resistance. The experimental results of Example 9, in which 1.5M butylmethylpyrrolidinium tetrafluoroborate (BMPBF$_4$) as a salt and 100% propylene carbonate (PC) as a solvent were used, exhibited 4.1% decrease in capacity and 7.5% increase in resistance. The experimental results of Example 11, in which 2.0M butylmethylpyrrolidinium tetrafluoroborate (BMPBF$_4$) as a salt and 100% propylene carbonate (PC) as a solvent were used, exhibited 4.0% decrease in capacity and 6.5% increase in resistance.

From the experimental results of Comparative Example 1 and Example 2, it can be seen that use of butylmethylpyrrolidinium tetrafluoroborate (BMPBF$_4$), which is an ionic liquid, exhibited reduction from 21% to 10% in capacity decrease and reduction from 45% to 25% in resistance increase, as compared to use of tetraethylammonium tetrafluoroborate (TEABF$_4$) as a salt of an electrolyte.

The experimental results of Examples 3, 9 and 11 show that an increasing amount of butylmethylpyrrolidinium tetrafluoroborate (BMPBF$_4$) under the same conditions leads to significant lowering of the capacity decrease and lowering of the resistance increase.

In addition, the experimental results of Example 6, in which 0.5M butylmethylpyrrolidinium tetrafluoroborate (BMPBF$_4$) was added while limiting test conditions such that the total moles of the electrolyte were constantly maintained at 1.5M, exhibited 5.0% drop in capacity and 15% increase in resistance; the experimental results of Example 8, in which 1.0M butylmethylpyrrolidinium tetrafluoroborate (BMPBF$_4$) was added, exhibited 5.5% drop in capacity and 8% increase in resistance; and the experimental results of Example 9, in which 1.5M butylmethylpyrrolidinium tetrafluoroborate (BMPBF$_4$) alone was used as a salt, exhibited 4.1% drop in capacity and 7.5% increase in resistance.

Likewise, the experimental results of Examples 6, 8 and 9 show that an increasing content of butylmethylpyrrolidinium tetrafluoroborate (BMPBF$_4$) even with the same total moles of the electrolyte leads to lowering of the capacity decrease and lowering of the resistance increase.

Comparative Example 1 and Example 4 show the experimental results obtained when propylene carbonate (PC) alone was used as a solvent, and Examples 1 and 5 show the experimental results obtained when a mixed solvent of propylene carbonate (PC) and ethylene carbonate (EC) in a ratio of 8:2 was used as a solvent.

The experimental results of Comparative Example 1 and Example 1 show reduction from 21% to 19.5% in capacity decrease and reduction from 45% to 30% in resistance increase. Particularly, the experimental results of Examples 3 and 5 show reduction from 12% to 8% in capacity decrease and reduction from 25% to 20% in resistance increase.

The experimental results of Comparative Example 1 and Examples 1, 3 and 5 show that use of a 8:2 mixed solvent of propylene carbonate (PC) and ethylene carbonate (EC) can significantly reduce the capacity decrease and reduce the resistance increase, as compared to single use of propylene carbonate (PC) as a solvent, under the same test conditions.

Therefore, according to the experimental results of Examples 1 through 11, it can be seen that increasing concentrations of the electrolyte leads to gradual reduction of capacity decrease and lowering of resistance increase, and increasing contents of butylmethylpyrrolidinium cations are also accompanied by gradual reduction of capacity decrease and lowering of resistance increase.

Example 12

A cell was fabricated in the same manner as in Example 9, except that 1.5M ethylmethylpyrrolidinium tetrafluoroborate (EMPBF$_4$) was used as a salt, instead of butylmethylpyrrolidinium tetrafluoroborate.

Example 13

A cell was fabricated in the same manner as in Example 9, except that 1.5M dimethylpyrrolidinium tetrafluoroborate (DMPBF$_4$) was used as a salt, instead of butylmethylpyrrolidinium tetrafluoroborate.

Table 3 below shows the composition of the electrolytes in accordance with Examples 9, 12 and 13, and Table 4 below shows the results of capacity and resistance as measured according to a high-temperature application test, using the above-fabricated cells. The high-temperature application test was carried out by maintaining the cells for 200 hours under conditions charged to a working voltage of 2.5V at a temperature of 60° C. This experiment was intended to predict the results of electrochemical stability and a long service life of the electrolytes.

TABLE 3

| | Total moles of electrolyte | Salts | | | Solvents | |
|---|---|---|---|---|---|---|
| | | BMPBF$_4$ | EMPBF$_4$ | DMPBF$_4$ | PC | EC |
| Ex. 9 | 1.5M | 1.5M | 0.0M | 0.0M | 100% | 0% |
| Ex. 12 | 1.5M | 0.0M | 1.5M | 0.0M | 100% | 0% |
| Ex. 13 | 1.5M | 0.0M | 0.0M | 1.5M | 100% | 0% |

TABLE 4

| | Initial Capacity (F) | Initial Resistance (mΩ) | Decrease in capacity (%) | Increase in resistance (%) |
|---|---|---|---|---|
| Ex. 9 | 61.0 | 11.9 | 7.0% | 10% |
| Ex. 12 | 61.5 | 11.5 | 9.5% | 15% |
| Ex. 13 | 61.5 | 11.2 | 10% | 17% |

As shown in Table 4, the experimental results of Example 9, in which 1.5M ethylmethylpyrrolidinium tetrafluoroborate (EMPBF$_4$) as a salt and 100% propylene carbonate (PC) as a solvent were used, exhibited 7% decrease in capacity and 10% increase in resistance. The experimental results of Example 12, in which 1.5M butylmethylpyrrolidinium tetrafluoroborate (BMPBF$_4$) as a salt and 100% propylene carbonate (PC) as a solvent were used, exhibited 9.5% decrease in capacity and 15% increase in resistance. The experimental results of Example 13, in which 1.5M butylmethylpyrrolidinium tetrafluoroborate (BMPBF$_4$) as a salt and 100% propylene carbonate (PC) as a solvent were used, exhibited 10% decrease in capacity and 17% increase in resistance.

From these experimental results, it can be said that it is also possible to use ethylmethylpyrrolidinium tetrafluoroborate (EMPBF$_4$) or dimethylpyrrolidinium tetrafluoroborate (DMPBF$_4$) other than butylmethylpyrrolidinium tetrafluoroborate (BMPBF$_4$), as a salt of an electrolyte, upon taking into account the facts that use of ethylmethylpyrrolidinium tetrafluoroborate (EMPBF$_4$) or dimethylpyrrolidinium tetrafluoroborate (DMPBF$_4$) as a salt of an electrolyte exhibited relatively low electrochemical stability, as compared to use of butylmethylpyrrolidinium tetrafluoroborate (BMPBF$_4$), but resulted in no significant difference in cycle characteristics and exhibited improved characteristics in capacity decrease and resistance increase, over the specified base values.

As detailed hereinabove, the electric double-layer capacitor in accordance with Examples of the present invention is characterized in that cycle characteristics and high-current charge/discharge characteristics are improved by establishing an electrolyte concentration in the range of 1.25 mol/L to 2.5 mol/L such that the capacitor can also be applied to activated carbon having capacitance of more than 100 F/g.

Further, according to the present invention, in order to increase the electrolyte concentration, a pyrrolidinium-based cation, which is an ionic liquid, is used as a solute, instead of the ammonium-based salt, or a certain level of the pyrrolidinium-based cation is used in admixture with the ammonium-based salt, thereby increasing the electrolyte concentration, which therefore enables achievement of a significant reduction in the capacity decrease and resistance increase.

In addition, according to the present invention, it is possible to improve cycle characteristics and high-current charge/discharge characteristics of the electric double-layer capacitor, via use of any one carbonate selected from the above-mentioned carbonate group as the solvent of the electrolyte, and use of the selected carbonate in admixture with ethylene carbonate having a relatively high dielectric constant of the solvent among carbonate-based solvents.

INDUSTRIAL APPLICABILITY

As discussed hereinbefore, the present invention provides effects of improving cycle characteristics and high-current charge/discharge characteristics of an electric double-layer capacitor, via adjustment of an electrolyte concentration of the capacitor to a predetermined level.

In addition, the present invention provides effects of reducing capacity decrease and resistance increase of an electric double-layer capacitor, upon high-current cycles, via use of an ionic liquid as a solute of an electrolyte, and combined use of the ionic liquid with other salts.

Further, the present invention provides effects of improving cycle characteristics and high-current charge/discharge characteristics of an electric double-layer capacitor, by increasing an electrolyte concentration via use of one or more carbonate-based solvents having a high dielectric constant and high conductivity, as a solvent of an electrolyte.

Although the preferred embodiments of the present invention have been disclosed with reference to the accompanying drawings, the present invention may be embodied in different forms and should not be misconstrued as being limited to the embodiments set forth herein, and those skilled in the art will appreciate that various modifications, additions and substitutions are possible without departing from the scope and spirit of the invention as disclosed in the accompanying claims. Therefore, it should be understood that the embodiments disclosed herein are provided only for illustrating the present invention and should not be construed as limiting the scope and spirit of the present invention.

The invention claimed is:
1. An electric double-layer capacitor comprising:
   an electrode portion composed of an anode and a cathode;
   a separator for providing electrical isolation between the anode and cathode; and
   an electrolyte solution which is filled in a space between the anode and cathode so as to form electric double-layers on surfaces of the anode and cathode when a predetermined voltage is applied, and in which a mixed solute of butylmethylpyrrolidinium of 0.25M to 1.5M and tetraethylammonium tetrafluoroborate of 1M to 0.25M is mixed in a solvent so as to have a concentration of 1.25 to 2.0 mol/L,
   wherein the solvent is propylene caronate (PC) or a mixture of the propylene carbonate (PC) and ethylene carbonate (EC).

2. The capacitor according to claim 1, wherein 10 to 40 vol % of the ethylene carbonate (EC) is contained in the solvent.

3. The capacitor according to claim 1, wherein the electrode is formed of activated carbon having capacitance of 100 to 300 F/g in an organic solvent.

* * * * *